United States Patent
Crawford

(10) Patent No.: US 6,650,404 B1
(45) Date of Patent: Nov. 18, 2003

(54) LASER RANGEFINDER RECEIVER

(75) Inventor: Ian D. Crawford, Longwood, FL (US)

(73) Assignee: Analog Modules, Inc., Longwood, FL (US)

( * ) Notice: Subject to any disclaimer, the term of this patent is extended or adjusted under 35 U.S.C. 154(b) by 0 days.

(21) Appl. No.: 10/156,151

(22) Filed: May 28, 2002

(51) Int. Cl.[7] .......................... G01C 3/08; G01S 13/08
(52) U.S. Cl. ..................... 356/5.01; 356/5.08; 342/134
(58) Field of Search .................. 356/4.01, 5.01, 356/5.15, 28, 28.5; 342/134–146

(56) References Cited

U.S. PATENT DOCUMENTS 5,267,016 A * 11/1993 Meinzer et al.
6,522,396 B1 * 2/2003 Halmos

* cited by examiner

Primary Examiner—Stephen C. Buczinski
(74) Attorney, Agent, or Firm—Gerald E. Linden

(57) ABSTRACT

In a laser rangefinder receiver, a return signal from a light-sensitive detector is passed through a high-pass filter, and is then processed in two separate circuit paths, a "signal" path and a "noise" path. The "signal" path employs a time-variable offset scheme to control receiver sensitivity. The "noise" path measures noise in the return signal, and maintain a noise-based threshold independent of the time-variable sensitivity of the "signal" path. No interstage coupling capacitors are employed, which contributes greatly to the receiver's quick saturation recovery.

28 Claims, 3 Drawing Sheets

LASER RANGEFINDER RECEIVER

TECHNICAL FIELD OF THE INVENTION

The present invention relates to laser rangefinder receivers and, more particularly, to laser rangefinder receivers employing the time-of-flight measurement method where multiple targets need to be resolved.

BACKGROUND OF THE INVENTION

Laser rangefinders are well known, and are used to measure distances to targets. Generally, a laser transmitter is used to beam a high intensity pulse of light onto a selected target. The light scattered from (echoed or reflected off of) the target is detected by an optical receiver (or "opto-receiver") which is normally located in close proximity to the laser transmitter. By measuring the transit time (time-of-flight) between a transmitted laser pulse and the received echo, the range (distance) to the target can be determined using a time-interval counter.

Targets may be in proximity to natural or man-made camouflage, resulting in multiple, closely-spaced returns (echoes). Such returns have to be distinguished from backscatter due to aerosols, smoke particles, and ground clutter. The dynamic range of return signal amplitudes is large, and depends collectively on target reflectivity, percentage of beam hitting the target, target range, and atmospheric attenuation. False pulses will occur if the receiver is too sensitive. Range errors and/or second pulse masking may be caused by a strong overloading signal. Second pulse masking often results when a strong pulse is followed closely by a weaker pulse. The first, stronger pulse overloads (saturates) the receiver, and the second pulse occurs before the receiver can recover. As a result, the second pulse is not detected.

A typical time-of-flight laser receiver typically comprises a low-noise detector/preamplifier, a differentiating stage, a time-programmed gain amplifier or time programmed threshold, and a comparator with a digital pulse output corresponding to the time of laser firing and the returned echo pulse signal. The comparator threshold may be a fixed value, or it can be set by a measurement of background noise to obtain a constant false-alarm-rate (FAR). Because of the gain needed to amplify a minimum signal, typically 5 or 6 time RMS noise, multiple stages are typically used. DC offsets build up with this gain, and can cause errors at the threshold, leading to false alarms or loss of sensitivity. This problem has been overcome in the past by using capacitive coupling between stages. However, with strong overloads, these interstage coupling capacitors can accumulate charge, resulting in baseline errors upon recovery, which can exacerbate the problem of false alarms and/or loss of sensitivity.

BRIEF DESCRIPTION (SUMMARY) OF THE INVENTION

It therefore is a general object of the present invention to provide an improved technique for performing laser rangefinding.

It is an object of this invention to provide laser rangefinder receiver electronics which changes the sensitivity with respect to time, yet allows a close second target to be measured with minimum error.

It is another object of this invention to provide a receiver without additional interstage coupling capacitors, thereby giving improved validity of the laser range measurement, minimizing false alarms, maximizing sensitivity and range accuracy, and providing excellent target discrimination.

According to the invention, a laser rangefinder receiver comprises a photoconductive detector; a high-pass element producing a detector signal; means for establishing a baseline for the detector signal; means for establishing a detection threshold, offset from the baseline by a threshold offset; and means for comparing the detector signal to the threshold. It should be understood that the detector may be external to the receiver, per se. The high-pass element may be a differentiator or a high-pass filter. The means for establishing a baseline may be a low-pass filter. A noise detector measures a noise level associated with the detector signal, and the noise level establishes the threshold offset from the baseline. The noise detector preferably establishes separate measurements of positive peaks and negative peaks, and the threshold offset is determined from a difference between the positive peak and negative peak measurements. Detector sensitivity is varied by initially decreasing detector sensitivity to a first level, then gradually increasing detector sensitivity to a second level after a trigger event. This can be implemented by means for producing a signal offset, means for establishing an initial level of signal offset, and means for gradually changing the signal offset to a second level. The means for producing a signal offset affects the threshold offset, therefore there is provided means for nulling out the effect on the threshold offset of the means for producing the signal offset. A method is also disclosed. A specific circuit embodiment is disclosed.

The inventive technique exhibits improved capability to distinguish between pulsed signals and noise, responds to a second pulse signal closely following a first pulse signal of either greater or less amplitude, and allows the simplicity and fidelity of DC coupling after a single differentiation. All these factors are desirable to provide error-free range measurement to the target of interest.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

Often, similar elements throughout the drawings may be referred to by similar references numerals. For example, the element 199 in a figure (or embodiment) may be similar or analogous in many respects to an element 199A in another figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199A, 199B, 199B, etc.

Figure 1:
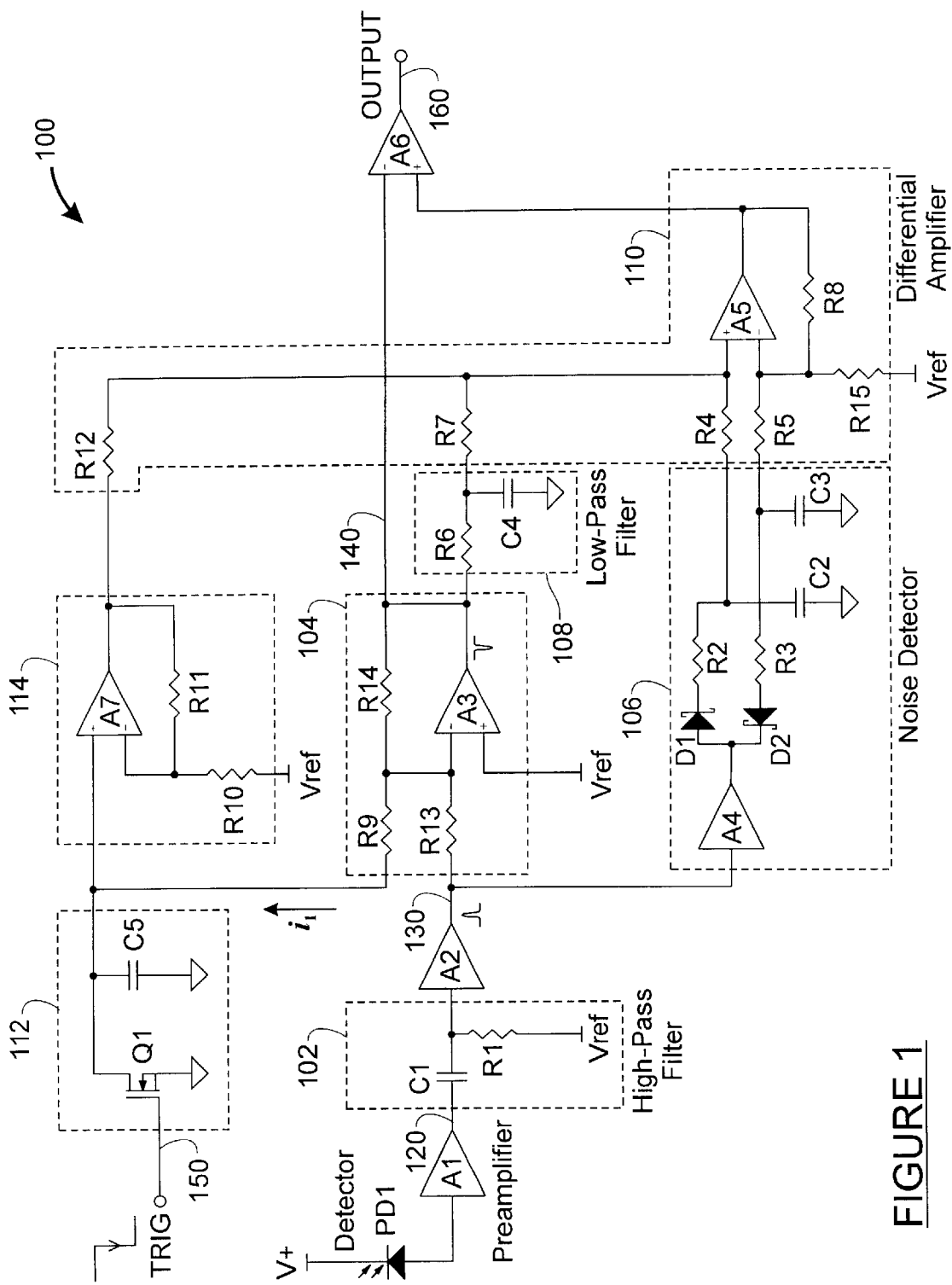
Figure 2A:
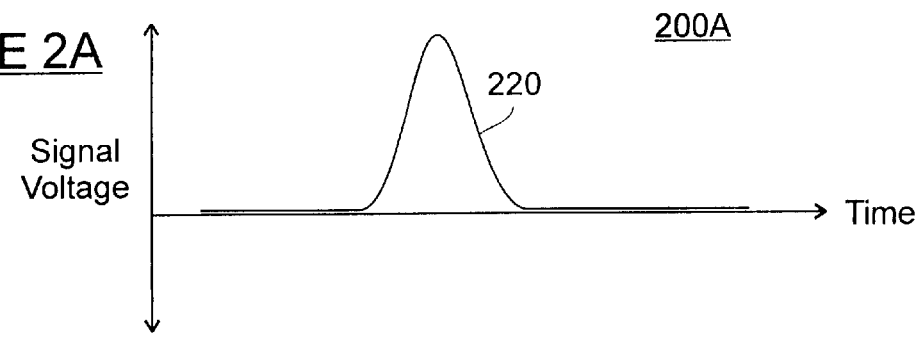
Figure 2B:
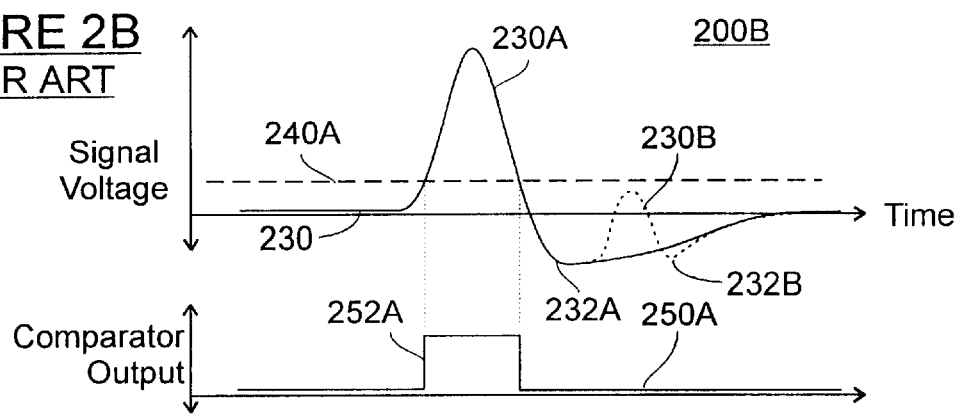
Figure 2C:
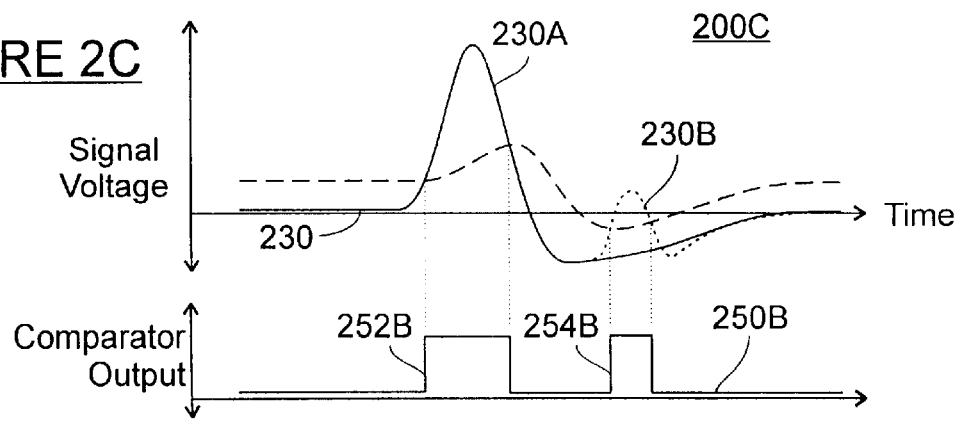
Figure 2D:
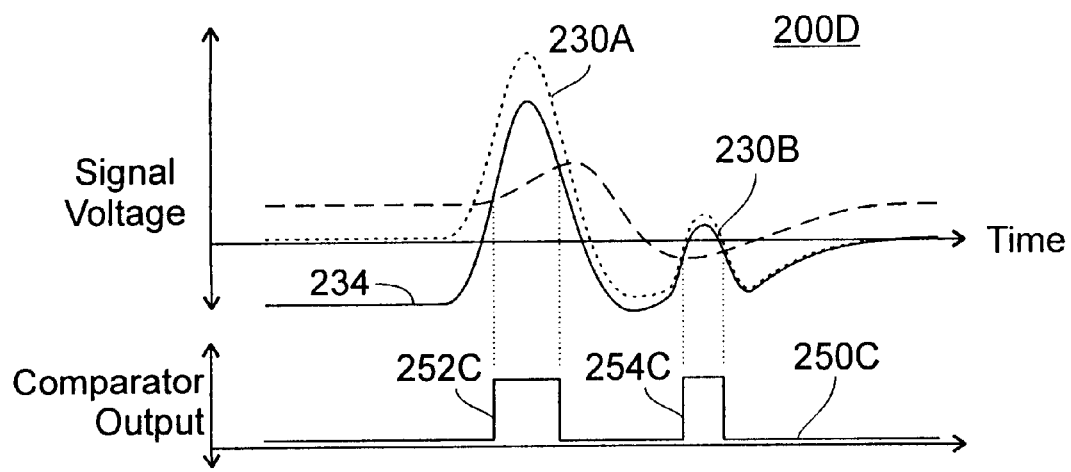

The structure, operation, and advantages of the present preferred embodiment of the invention will become further apparent upon consideration of the following description taken in conjunction with the accompanying drawings, wherein:

FIG. 1 is a schematic block diagram of a laser rangefinder receiver, according to the invention;

FIG. 2A is a graph of a typical laser pulse return, as seen at the preamplifier output (ref. A1, 120—FIG. 1), prior to high-pass filtering, according to the invention;

FIG. 2B is a graph of a response of a typical detector and high-pass filter to a typical laser return pulse, employing a fixed threshold detection method, according to the prior art;

FIG. 2C is a graph of a response of a typical detector and high-pass filter to two laser return pulses, employing a variable threshold detection technique, according to the invention; and FIG. 2D is a graph similar to FIG. 2C showing the effect of time-variable sensitivity adjustment, according to the invention.

DETAILED DESCRIPTION OF THE INVENTION

The present invention relates to improvements in laser rangefinder receiver electronics.

FIG. 1 illustrates an embodiment of a laser rangefinder receiver 100. The receiver 100 comprises a plurality of individual electronic components, connected to one another as illustrated, which are described hereinbelow. The elements are labeled, whenever appropriate, with conventional schematic-style references comprising a letter (e.g., A, C, R) indicating the type of electronic component (e.g., amplifier, capacitor, resistor, respectively) followed by a number indicating the iteration of that element (e.g., "1" meaning a first of typically several of a given type of electronic component). Additionally, selected components of the receiver 100 are grouped by sub-functions as indicated by dashed line sections 102, 104, 106, 108, 110, 112 and 114. Components such as resistors and capacitors typically have two terminals, which are referred to herein as "ends". In some instances, "signals" are referred to, and reference numerals point to lines which carry said signals.

A light-sensitive detector PD1, preferably a conventional photoconductive diode, acts as the signal source for the optical receiver, and is positioned such that an incident light beam falling upon an active area of the detector PD1 will induce a signal current. Low-intensity levels of incident light on the photoconductive detector PD1 induce a small signal current, and larger intensity levels of incident light induce a larger signal current. For purposes of this discussion, the photoconductive detector PD1 is assumed to respond instantaneously and linearly to incident light.

Receiver Topology

The signal from the detector PD1 is received and amplified by preamplifier A1 to produce a preamplifier output signal 120. In order to eliminate low-frequency backscatter or clutter, the preamplifier output signal 120 is processed by a high-pass element, such as a high-pass filter 102 (indicated by a dashed box) comprising a capacitor C1 and a resistor R1. The capacitor C1 is connected via a first end to the output of preamplifier A1 and via a second end to a first end of the resistor R1, forming a junction therebetween. A second end of the resistor R1 is connected to a reference voltage Vref. A high-pass filtered signal at the junction between the capacitor C1 and the resistor R1 is connected to an input of a buffer amplifier A2. The buffer amplifier A2 produces a buffered detector signal 130 at an output thereof.

The buffered detector signal 130 is connected to a first input of an inverting amplifier 104 (indicated by a dashed box) and to a noise detector 106 (also indicated by a dashed box). The inverting amplifier 104 comprises an operational amplifier A3 and resistors R9, R13 and R14. The operational amplifier A3 has an inverting input (−), a non-inverting input (+), and an output. All three resistors R9, R13 and R14 have a first end connected to the inverting input (−) of the operational amplifier A3. A second end of the resistor R13 forms the first input to the inverting amplifier 104. A second end of the resistor R9 forms a second input to the inverting amplifier 104. A second end of the resistor R14 is connected to the output of the operational amplifier A3, and forms an output of the inverting amplifier 104. The non-inverting input (+) of the operational amplifier A3 is connected to a reference voltage Vref. The output of the inverting amplifier 104 produces an inverted detector signal 140.

The noise detector 106 comprises a buffer amplifier A4, a diode D1, a diode D2, a resistor R2, a resistor R3, a capacitor C2 and a capacitor C3. Further, the noise detector 106 has an input, a positive noise value output and a negative reference output. An input of the buffer amplifier A4 forms the input of the noise detector 106. In the implementation shown in FIG. 1, an output of the buffer amplifier A4 is connected to an anode end of the diode D1 and to a cathode end of the diode D2. A cathode end of the diode D1 connects to a first end of the resistor R2. A second end of the resistor R2 connects to a first end of the capacitor C2, forming a junction therebetween and also forming the positive peak output of the noise detector 106. A second end of the capacitor C2 is connected to a ground reference. An anode end of the diode D2 is connected to a first end of the resistor R3. A second end of the resistor R3 is connected to a first end of the capacitor C3, forming a junction therebetween and also forming the negative peak output of the noise detector 106. One having ordinary skill in the art will understand that the rectifier outputs may be included within a feedback loop back to the input of buffer amplifier A4 so that the voltage drop across the rectifiers is made negligible by the open loop gain of the buffer amplifier, A4. It should farther be understood by those of ordinary skill in the art that any suitable type of noise detector may be used including, but not limited to peak-to-peak, average or RMS (Root Mean Square), as long as the detector's output represents AC deviations of the buffered detector signal from a baseline (quiescent) value. This is preferably accomplished by providing the noise detector with a differential output, as shown in FIG. 1. In the embodiment shown in FIG. 1, the common mode value of the noise detector's output is cancelled by the combining element 110, as described in greater detail hereinbelow.

The inverted detector signal 140 (from the output of the inverting amplifier 104) connects to an input of a low-pass filter 108 (indicated by a dashed box) and to a negative input (−) of a comparator A6. The low-pass filter 108 comprises a resistor R6 and a capacitor C4, and has an input and an output. A first end of the resistor R6 forms the input of the low-pass filter 108. A second end of the resistor R6 connects to a first end of the capacitor C4, forming a junction therebetween and also forming the output of the low-pass filter 108. A second end of the capacitor C4 connects to a ground reference.

A combining element, shown as a differential amplifier 110, comprises an operational amplifier A5 and resistors R4, R5, R7, R8, R12 and R15. The operational amplifier A5 has an inverting input (−), a non-inverting input (+) and an output. The resistor R8 is connected between the output and the inverting input (−) of the operational amplifier A5. A first end of the resistor R5 forms an inverting input to the differential amplifier 110. A second end of the resistor R5 connects to the inverting input of the operational amplifier A5. First ends of the resistor R4, resistor R7 and resistor R12 form first, second and third non-inverting inputs, respectively, of the differential amplifier 110. Second ends of the resistors R4, R7 and R12 are all connected to the non-inverting input (+) of the operational amplifier A5. A first end of the resistor R15 is connected to the inverting input of operational amplifier A5. A second end of the resistor R15 is connected to a reference voltage Vref. The output of the operational amplifier A5 forms an output of the differential amplifier 110.

A trigger circuit 112 comprises an N-channel field-effect transistor (FET) Q1 and a capacitor C5. The trigger circuit 112 has a trigger input and an output. The FET Q1 has gate, source and drain terminals. The gate terminal forms the input to the trigger circuit 112 on which it receives a trigger signal (TRIG) 150. The source terminal is connected to a ground reference and the drain terminal is connected to a first end of the capacitor C5, forming a junction therebetween and also forming the output of the trigger circuit 112. A second end of the capacitor C5 is connected to a ground reference.

The output of the trigger circuit 112, is connected to the second input of the inverting amplifier 104 (second end of the resistor R9) and to an input of a non-inverting amplifier 114. The non-inverting amplifier 114 comprises an operational amplifier A7, a resistor R10 and a resistor R11. The operational amplifier A7 has an inverting input (−), a non-inverting input (+) and an output. The non-inverting input (+) of the operational amplifier A7 forms the input of the non-inverting amplifier 114. The output of the operational amplifier A7 forms an output of the non-inverting amplifier 114. A first end of the resistor R11 is connected to the output of the operational amplifier A7. A second end of the resistor R11 is connected to the inverting input of the operational amplifier A7 and to a first end of the resistor R10. A second end of the resistor R10 is connected to a reference voltage Vref.

The negative input (R5) of the differential amplifier 110 is connected to the negative peak output (R3/C3) of the noise detector 106. The first, second, and third non-inverting inputs (R4, R7, R12) of the differential amplifier 110 are connected to the positive peak output of the detector 106, the output of the low-pass filter 108, and the output of the non-inverting amplifier, respectively.

The comparator A6 has a positive input, a negative input, and an output. The positive input is connected to the output of the differential amplifier 110. The negative input is connected to the output of the inverting amplifier 104. The output of the comparator A6 produces a receiver output signal (OUTPUT) 160.

Receiver Functional Description

A low-level signal from the detector PD1 is first amplified and buffered by the preamplifier A1. The preamplifier output 120 is representative of any and all light signals impinging upon the detector PD1, including those undesired signals due to low-frequency backscatter and clutter. Since these undesired signals are generally out-of-band with respect to higher-frequency pulses expected by the receiver 100, they can be substantially eliminated with DC and low-frequency blocking circuitry by employing a high-pass element such as a differentiator or high-pass filter. In the example of FIG. 1, a high-pass filter 102 is employed. The high-pass filter effectively blocks the lower-frequency backscatter and clutter components in the preamplifier output signal 120.

The output of the high-pass filter 102 is then buffered by the buffer amplifier A2, preferably a fast-recovery DC amplifier. It should be noted that the entire laser rangefinder receiver 100 is DC-coupled after the high-pass filter, that is, there are no DC-blocking elements (e.g., interstage coupling capacitors) employed. This contributes greatly to the receiver's quick saturation recovery. Charge storage in interstage coupling elements is a significant contributor to slow saturation recovery (overload recovery) in AC-coupled receivers.

The buffered detector signal 130 from the buffer amplifier A2 is processed by two separate circuit paths, a "signal" path via the inverting amplifier 104, and a "noise" path via the noise detector 106. The "signal" path via the inverting amplifier 104 employs a time-variable offset scheme controlled by the trigger circuit 112 to affect receiver sensitivity. The "noise" path, through the noise detector 106 is independent of the variable-offset inverting amplifier 104 so that it continues to measure noise and maintain a noise-based threshold independent of the time-variable sensitivity of the "signal" path.

The "signal" path comprises the inverting amplifier 104, the output of which is connected directly to the negative input (−) of the comparator A6, where it is compared to a threshold voltage at the positive input (+) thereof. The inverted detector signal 140 at the output of the inverting amplifier 104 is further processed by a the low-pass filter 108, which produces an output representative of the average DC level or "baseline" of the inverted detector signal 140, used in determining the aforementioned threshold voltage, as described in greater detail hereinbelow.

The "noise" path comprises the noise detector 106, which measures the overall "noise" level present in the buffered detector signal 130. This "noise" level measurement is used also in generating the aforementioned threshold voltage.

The noise detector 106 is illustrated as a quasi peak-to-peak noise detector and operates by re-buffering the buffered detector signal 130 and storing positive and negative signal "peaks" separately. The diode D1 directs positive signal peaks to the capacitor C2 via the resistor R2, and the diode D2 directs negative signal peaks to the capacitor C3 via the resistor R3. Preferably, the diodes D1 and D2 are Schottky diodes. Unlike a true peak-to-peak detector, however, the noise detector 106 includes resistors R2 and R3 in series with its peak storage capacitors C2 and C3, respectively. The resistor R2 serves as a current-limiter to limit the rate at which charge can accumulate on the capacitor C2. Similarly, the resistor R3 limits the rate at which charge can accumulate on the capacitor C3. The discharge rates of the capacitors C2 and C3 are determined by the impedance seen at the first non-inverting input and the inverting input, respectively, of the differential amplifier 110, and any parallel impedances used to fold the diodes inside the feedback loop of A4. Without this charge rate limitation, a single large, isolated noise spike or single pulse would immediately charge the capacitors C2 and C3 to the high and low peaks, respectively, of the pulse, resulting in an overstated peak-to-peak noise measurement. By limiting the charging current, the effect of a single, isolated noise spike or pulse is reduced so that the output of the noise detector 106 more accurately reflects the overall noise level present in the buffered detector signal 130. A voltage differential between the voltages present on the capacitors C2 and C3 is generally proportional to and representative of the noise level. At high temperatures or in the presence of high background light conditions, this voltage differential typically increases.

The differential amplifier 110 acts as a "combiner", wherein the threshold voltage is derived from several components. The threshold voltage appears at the output of the differential amplifier 110, and is connected directly to the positive input (+) of the comparator A6. When the inverted detector signal 140 at the negative input (−) of the comparator A6 becomes lower than the threshold voltage, a "high" level signal output 160 is generated by the comparator A6. The threshold voltage is normally maintained somewhat below the average level of the inverted detector signal 140 so that a (negative-going) pulse in the inverted detector signal 140 will produce a positive-going pulse in the output signal 160.

The threshold voltage generated by the differential amplifier 110 is the sum of three components: (i) the noise measurement value made from the difference in noise detector outputs with any common mode offset rejected, (ii) the average value or "baseline" of the inverted detector signal 140 (at the output of the low-pass filter 108) and (iii) a level-compensating signal from the non-inverting amplifier 114 (discussed in greater detail hereinbelow). The proportions of each of these signals in the threshold voltage are determined primarily by the values chosen for the resistors R4, R5, R7, R8, R9, R10, R11, R12 and R14. To reject the common mode voltage from the noise detector 106, the value of the resistor R4 is equal to the value of the resistor R5, the value of the resistor R8 is equal to the sum of the values of the resistors R6 and R7, and the value of the resistor R15 is equal to the value of the resistor R12. The gain of the amplifier A5 is set by the ratio of the feedback resistor R8 to the value of input resistors R4 and R5.

The "baseline" component of the threshold voltage effectively negates the effects of any DC offsets in the "signal" path. The noise level component of the threshold voltage causes the threshold voltage to adapt to the amount of steady-state "noise" in the detector signal, thereby dynamically adjusting the threshold voltage to minimize false "triggering" of the comparator (i.e., generation of output pulses that correspond only to low-level random noise components of the detector signal).

In a laser range-finding system, it is useful to gradually increase receiver sensitivity from a minimum value to a maximum value beginning at the instant a laser pulse is generated. In this way, the receiver will be set for lower sensitivity (higher threshold of detection) for near-field (short-range) echoes, which are generally higher in amplitude, while the receiver will be set for higher sensitivity (lower threshold of detection) for far-field (longer-range) echoes, which are generally weaker. This is known as time-variable gain or sensitivity.

One approach to providing time-variable gain is to control the gain of a variable-gain amplifier. However, the design of a variable-gain amplifier is complex and requires great care to avoid introducing any baseline shift or other control artifacts in its signal output due to feed through of the gain control signal(s).

The receiver 100 of FIG. 1 uses a simpler, alternative approach to time-variable sensitivity-namely, adding a time-variable offset to the buffered detector signal 130. The use of DC-coupling in the inverting amplifier 104 allows an offset current $i_1$ to be drawn from a summing junction formed at the inverting input (−) of the operational amplifier A3. Feedback around the operational amplifier A3 via the resistor R14 will cause the summing junction to be maintained equal to the reference voltage Vref at the non-inverting input (+) of the operational amplifier A3. The offset current $i_1$ will be equal to the difference between Vref and the output of the trigger circuit 112 divided by the value of the resistor R9. The trigger input 150 to the gate of the n-channel FET Q1 in the trigger circuit 112 is normally maintained "high", thereby causing the FET Q1 to conduct and maintain a zero voltage across the capacitor C5. When a laser pulse is generated (by external circuitry, not shown), the trigger input 150 is brought "low", causing the FET Q1 to stop conducting. While the trigger input 150 is "high" and the FET Q1 is conducting, the offset current $i_1$ is given by:

$$i_1(initial) = \frac{Vref}{R9}$$

After the trigger signal is brought "low", at approximately the time $t_0$ the laser pulse is generated, the offset current $i_1$ is given by:

$$i_1 = \frac{Vref}{R9} e^{-\left[\frac{(t-t_0)}{R9 \cdot C5}\right]}$$

A resulting positive offset voltage ($v_{offset}$, or "signal offset") at the output 140 of the inverting amplifier 104 is given by:

$$v_{offset} = i_1 \cdot R14 = \frac{Vref \cdot R14}{R9} \cdot e^{-\left[\frac{(t-t_0)}{R9 \cdot C5}\right]}$$

By adding this offset voltage, the detection threshold for any received pulse signal (which will appear as a negative-going pulse at the output 140 of the inverting amplifier 104) is increased by the amount of the offset (referenced back to the input signal level). The signal from the detector must overcome this offset in addition to the threshold level determined from the noise level and the signal "baseline". The offset current is reduced as a function of time (i.e., range, distance). The simple exponential R-C discharge of the capacitor C5 and resistor R9 yields a decaying current whose time constant may be selected to closely match the required sensitivity increase with time. In the circuit of FIG. 1, as shown, the initial current, Vref/R9, can be chosen such that in the absence of a detector signal, the operational amplifier A3 is saturated. In this case, to produce any negative-going output from the operational amplifier A3, a pulse must appear in the buffered detector signal 130 sufficient in amplitude to overcome the offset current $i_1$, take the operational amplifier A3 out of saturation and cross the detection threshold at the comparator A6. The operational amplifier A3 is designed for fast recovery from saturation resulting from pulses where the current through the resistor R13 exceeds $i_1$. If no other steps were taken during the time while the operational amplifier A3 is saturated, the output of the low-pass filter 108 would rise and the differential amplifier 110 would re-reference itself to the saturation voltage level of the operational amplifier A3, thereby reducing the threshold level and having the effect of increased sensitivity. This would be undesirable, and is eliminated by nulling out the effect of the voltage on the capacitor C5 at the threshold. This is done by adding the operational amplifier A7, with substantially the same characteristics as the operational amplifier A3, and configuring it as a non-inverting amplifier 114 with the same (absolute value) gain as the inverting amplifier 104 when measured from the capacitor C5 to the comparator A6 input via R9, A3, R14, and from C5 to the threshold level via A7, R11, R10, R12, and A5 Configured in this way, in the absence of signal at the detector PD1, the non-inverting amplifier 114 will saturate at about the same time as the operational amplifier A3, but at opposite polarity. By selecting appropriate values for the resistors R10, R11 and R12, the output of the non-inverting amplifier 114 can be used to substantially cancel out the effects of the voltage across the capacitor C5 on the threshold voltage by effectively mirroring and negating its effect on the output of the low-pass filter 140.

A significant advantage of the present invention is that DC errors (offsets) in the signal path (A1, A2, A3) do not adversely affect the false alarm rate or sensitivity, since the threshold value is referenced to the signal path's DC baseline.

Another advantage of the present inventive technique is improved target discrimination, due to its ability to detect closely spaced pulses of widely differing amplitude, especially in the case of strong pulse echoes closely followed by weaker pulse echoes. This is shown and described below with respect to FIGS. 2A, 2B, 2C and 2D.

FIG. 2A is a graph 200A of a response 220 to a typical laser pulse return, as seen at the preamplifier output (ref. A1, 120—FIG. 1), prior to high-pass filtering.

As described hereinabove, a high-pass element, such as a high-pass filter or differentiator, is commonly used following the preamplifier to reject low-frequency clutter and detector/preamp DC components. One of the consequences of using such circuitry, however, is the introduction of an undershoot following a pulse due to differentiation of the trailing edge of the pulse. This is shown in FIG. 2B.

FIG. 2B is a graph 200B showing the response 230 of a typical detector and high-pass filter to a pulse 230A similar to the one shown in FIG. 2A, and detector (comparator) output 250A employing a prior art fixed threshold detection method. A signal undershoot 232A following the pulse 230A is shown. With respect to FIG. 1, the response 230 reflects the buffered detector signal 130 as seen at the output of the buffer amplifier A2. The effect of a second, weaker pulse 230B following the first pulse is shown as a dashed line, representing the effect of a weaker, secondary reflection of a laser pulse off of a secondary, more distant target. (Note that the secondary pulse results in a second, proportionally smaller undershoot 232B of its own). Dashed line 240A represents a fixed detection threshold against which the pulse signals 230A and 230B are compared. The resultant comparator output 250A exhibits a pulse 252A at the point where the first pulse 230A crosses the threshold 240A. The second pulse 230B never crosses the fixed detection threshold 240A, and never produces a second pulse in the comparator output 250A. The second pulse 230B has been "missed" by the prior art fixed-threshold detection technique.

FIG. 2C is a graph 200C showing the response 230 of a typical detector and high-pass filter to two pulses 230A and 230B identical to that shown and described above with respect to FIG. 2B, but showing detector (comparator) output 250B employing the present inventive dynamically variable threshold detection technique as described in detail hereinabove. Dashed line 240B represents a detection threshold (referenced to the buffered detector signal 130) generated by the present inventive technique against which the pulse signals 230A and 230B are compared, as seen at the comparator input (ref A6, FIG. 1). The threshold 240B is offset (vertically in the figure) from the signal 230 due to the noise detector's contribution to the threshold (ref. 106, FIG. 1) and tracks the signal's baseline due to the low-pass filter's contribution (ref 108, FIG. 1). The resultant comparator output 250A exhibits a pulse 252B at the point where the first pulse 230A crosses the threshold 240B and a second pulse 254B at the point where the second pulse 230B crosses the threshold 240B. The second pulse 230B, therefore, has been correctly detected, clearly indicating the improvement of the present inventive technique over prior art fixed-threshold techniques.

FIG. 2D is a graph 200D similar to FIG. 2C, but illustrating the effect of time-variable sensitivity adjustment. The time scale of the time-variable sensitivity is not to scale when compared to the pulses, but is generally illustrative of the circuit operation. The response 230 (buffered detector signal 130) showing pulse responses 230A and 230B is shown as a dashed line. As described in detail hereinabove, the effect of the "trigger" circuit is to initially offset the signal response. The effect of the trigger circuit is nulled in the detection threshold. The cumulative effect is to decrease receiver detection sensitivity by effectively increasing the voltage differential between the signal and the detection threshold. After a laser pulse is generated, the circuit is "triggered" (shortly before the first pulse 230A), permitting the offset to decrease, slowly permitting the overall signal response to rise towards a non-offset condition, thereby gradually increasing sensitivity. The offset response 234 shows the effect of this offset as seen in the inverted output signal 140 (re-inverted and referenced to the buffered detector signal 130, for clarity) and its effect on the comparator output 250C. Initially, response 234 is offset below the response 230 shown and described hereinabove with respect to FIGS. 2B and 2C. After "triggering" shortly before the onset of the first pulse 230A, the voltage differential between the offset response 234 and the non-offset response 230 gradually diminishes until they are essentially equivalent. The offset results in some narrowing of the detected pulses 252C and 254C, but produces further noise immunity.

It will be readily apparent to those of ordinary skill in the art that there are numerous possible embodiments of the present invention that would produce substantially the same results. For example, a differentiator (not shown) could be used in place of the high-pass filter (102), numerous different types of noise detectors are possible, polarities can be changed (e.g., opposite to those which are illustrated), etc..

It will be further evident to those of ordinary skill in the art that some of the dynamically variable components of the thresholding and sensitivity reduction techniques described hereinabove can be applied either to the signal or to the threshold without affecting the resultant comparator (detector) output. For example, the noise measurement component can be applied as an offset to the signal path rather than as a threshold adjustment.

Since the foregoing illustrations and descriptions of the invention are intended to be illustrative only and are not intended to be limiting, these variations on the embodiment (s) shown and described hereinabove are fully within the spirit and scope of the present inventive technique and are anticipated thereby.

It is further anticipated that in some cases, dynamic detection of the noise level may not be necessary. Accordingly, it will be immediately evident to those of ordinary skill in the art to employ a fixed offset between the signal and the baseline, thereby eliminating the noise detector.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A laser rangefinder receiver, comprising:
   a light-sensitive detector;
   a high-pass element producing a detector signal;
   means for establishing a baseline for the detector signal;
   means for establishing a detection threshold, offset from the baseline by a threshold offset; and
   means for comparing the detector signal to the threshold; wherein:
   a noise detector establishes separate measurements of positive peaks and negative peaks; and
   a threshold offset is determined from a difference between the positive peak and negative peak measurements.

2. A laser rangefinder receiver according to claim 1, wherein:
   the high-pass element comprises a differentiator.

3. A laser rangefinder receiver according to claim 1, wherein:
   the high-pass element comprises a high-pass filter.

4. A laser rangefinder receiver according to claim 1, wherein:
   the means for establishing a baseline comprises a low-pass filter.

5. A laser rangefinder receiver according to claim 1, further comprising:
   a noise detector for measuring a noise level associated with the detector signal;
   wherein:
   the noise level establishes the threshold offset from the baseline.

6. A laser rangefinder receiver according to claim 5, wherein:
   the noise detector is an averaging circuit for detecting average noise level.

7. A laser rangefinder receiver according to claim 5, wherein:
   the noise detector is an RMS circuit for detecting RMS noise level.

8. A laser rangefinder receiver, comprising:
   a light-sensitive detector;
   a high-pass element producing a detector signal;
   means for establishing a baseline for the detector signal;
   means for establishing a detection threshold, offset from the baseline by a threshold offset; and
   means for comparing the detector signal to the threshold;
   further comprising:
   means for varying detector sensitivity by initially decreasing detector sensitivity to a first level, then gradually increasing detector sensitivity to a second level after a trigger event.

9. A laser rangefinder receiver according to claim 8, wherein the means for varying detector sensitivity further comprises:
   means for producing a signal offset;
   means for establishing an initial level of signal offset; and
   means for gradually changing the signal offset to a second level.

10. A laser rangefinder receiver according to claim 8, wherein:
    the high-pass element comprises a differentiator.

11. A laser rangefinder receiver according to claim 8, wherein:
    the high-pass element comprises a high-pass filter.

12. A laser rangefinder receiver according to claim 8, wherein:
    the means for establishing a baseline comprises a low-pass filter.

13. A laser rangefinder receiver according to claim 8, further comprising:
    a noise detector for measuring a noise level associated with the detector signal;
    wherein:
    the noise level establishes the threshold offset from the baseline.

14. A laser rangefinder receiver according to claim 13, wherein:
    the noise detector is an averaging circuit for detecting average noise level.

15. A laser rangefinder receiver according to claim 13, wherein:
    the noise detector is an RMS circuit for detecting RMS noise level.

16. A method of detecting laser pulses comprising:
    providing a light-sensitive detector for producing a first signal;
    filtering the first signal via a high-pass element to produce a detector signal;
    establishing a baseline for the detector signal;
    establishing a detection threshold, offset from the signal baseline; and
    comparing the detector signal to the threshold;
    further comprising:
    making separate measurements of positive and negative noise peaks; and
    determining the threshold offset from a difference between the positive peak and negative peak measurements.

17. A method of detecting laser pulses according to claim 16, wherein:
    the high-pass element comprises a differentiator.

18. A method of detecting laser pulses according to claim 16, wherein:
    the high-pass element comprises a high-pass filter.

19. A method of detecting laser pulses according to claim 16, wherein:
    the means for establishing a baseline is a low-pass filter.

20. A method of detecting laser pulses according to claim 16, further comprising:
    measuring a noise level associated with the detector signal; and
    establishing a threshold offset from the baseline based upon the measured noise level.

21. A method of detecting laser pulses comprising:
    providing a light-sensitive detector for producing a first signal;
    filtering the first signal via a high-pass element to produce a detector signal;
    establishing a baseline for the detect or signal;
    establishing a detection threshold, offset from the signal baseline; and
    comparing the detector signal to the threshold;
    further comprising:
    varying detector sensitivity by initially decreasing detector sensitivity to a first level, then gradually increasing detector sensitivity to a second level after a trigger event.

22. A method of detecting laser pulses according to claim 21, wherein:
   the high-pass element comprises a differentiator.

23. A method of detecting laser pulses according to claim 21, wherein:
   the high-pass element comprises a high-pass filter.

24. A method of detecting laser pulses according to claim 21, wherein:
   the means for establishing a baseline is a low-pass filter.

25. A method of detecting laser pulses according to claim 21, further comprising:
   measuring a noise level associated with the detector signal; and
   establishing a threshold offset from the baseline based upon the measured noise level.

26. A method of detecting laser pulses according to claim 21, further comprising:
   producing a signal offset;
   establishing an initial level of signal offset; and
   gradually changing the signal offset to a second level.

27. Laser rangefinder receiver having an input for receiving a detector signal from a light-sensitive detector and an output, comprising:
   a high-pass filter connected to the output of the preamplifier, and having an output;
   a first amplifier having a first input, a second input and an output;
   a low-pass filter connected to the output of the first amplifier, and having an output;
   a noise detector having an input, a negative peak output, and a positive peak output;
   the output of the high-pass filter connected to the first input of the inverting amplifier and connected to the input of the noise detector;
   a combining element having an inverting input, a first non-inverting input, a second non-inverting input, a third non-inverting input, and an output;
   a trigger circuit for receiving a trigger pulse, and having an output;
   the output of the trigger circuit connected to the second input of the inverting amplifier;
   the negative peak output of the noise detector connected to the inverting input of the differential amplifier;
   the positive peak output of the noise detector connected to the first non-inverting input of the differential amplifier;
   the output of the low-pass filter connected to the second non-inverting input of the differential amplifier;
   the output of the trigger circuit connected to the third non-inverting input of the differential amplifier;
   a comparator having a positive input, a negative input and an output;
   the output of the differential amplifier connected to the positive input of the comparator; and
   the output of the inverting amplifier connected to the negative input of the comparator;
   wherein the output of the comparator comprises the output of the laser rangefinder receiver.

28. A laser rangefinder receiver according to claim 27, further comprising:
   a preamplifier connected between the receiver input and the high-pass filter;
   a buffer amplifier connected between the output of the high-pass filter and the first input of the first amplifier, and also between the output of the high-pass filter and the input of the noise detector; and
   a non-inverting amplifier connected between the output of the trigger circuit and the third non-inverting input of the differential amplifier.

* * * * *